(12) United States Patent
Purvis et al.

(10) Patent No.: US 7,804,839 B2
(45) Date of Patent: Sep. 28, 2010

(54) INTERCONNECTING MULTIPLE MPLS NETWORKS

(75) Inventors: Scott Purvis, Richardson, TX (US); Scott J. Hoover, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 399 days.

(21) Appl. No.: 11/693,283

(22) Filed: Mar. 29, 2007

(65) Prior Publication Data

US 2008/0240125 A1    Oct. 2, 2008

(51) Int. Cl.
    *H04L 12/28* (2006.01)
(52) U.S. Cl. .................. 370/401; 370/467; 370/228
(58) Field of Classification Search .................. None
    See application file for complete search history.

(56) References Cited

U.S. PATENT DOCUMENTS

| 2004/0223497 | A1* | 11/2004 | Sanderson et al. | 370/395.52 |
| 2005/0195835 | A1* | 9/2005 | Savage et al. | 370/401 |
| 2006/0092950 | A1* | 5/2006 | Arregoces et al. | 370/396 |
| 2007/0019558 | A1* | 1/2007 | Vasseur et al. | 370/248 |
| 2007/0091793 | A1* | 4/2007 | Filsfils et al. | 370/228 |

* cited by examiner

*Primary Examiner*—Chi H Pham
*Assistant Examiner*—Kouroush Mohebbi

(57) ABSTRACT

A network may include a first customer edge (CE) router and a second CE router. The first CE router may run an external border gateway protocol (EBGP) to exchange routing information with a first provider edge (PE) router that is in a first multi-protocol label switching (MPLS) network and may run an interior gateway protocol (IGP) to exchange routing information with the second CE router. The second CE router may run the IGP to exchange routing information with the first CE router and may run the EBGP to exchange routing information with a second PE router in a second MPLS network.

16 Claims, 8 Drawing Sheets

INTERCONNECTING MULTIPLE MPLS NETWORKS

BACKGROUND INFORMATION

A business or an organization may sometimes connect to multiple networks for different services. In some instances, an organization may connect to multiple Multi-Protocol Label Switching (MPLS) networks. If one or more of the MPLS network need resources at other MPLS networks, the organization may wish to establish network paths between the MPLS networks.

DETAILED DESCRIPTION OF PREFERRED EMBODIMENTS

The following detailed description refers to the accompanying drawings. The same reference numbers in different drawings may identify the same or similar elements.

Implementations described herein may relate to establishing network paths between multiple MPLS networks. The MPLS networks may be interconnected using devices that exchange routing information with each other through Internal Gateway Protocol (IGP) and with routers in the MPLS network through External Border Gateway Protocol (EBGP). By using IGP to exchange routing information with MPLS networks, it may be possible to obtain efficient network summarization and control over routing at the devices.

Figure 1:
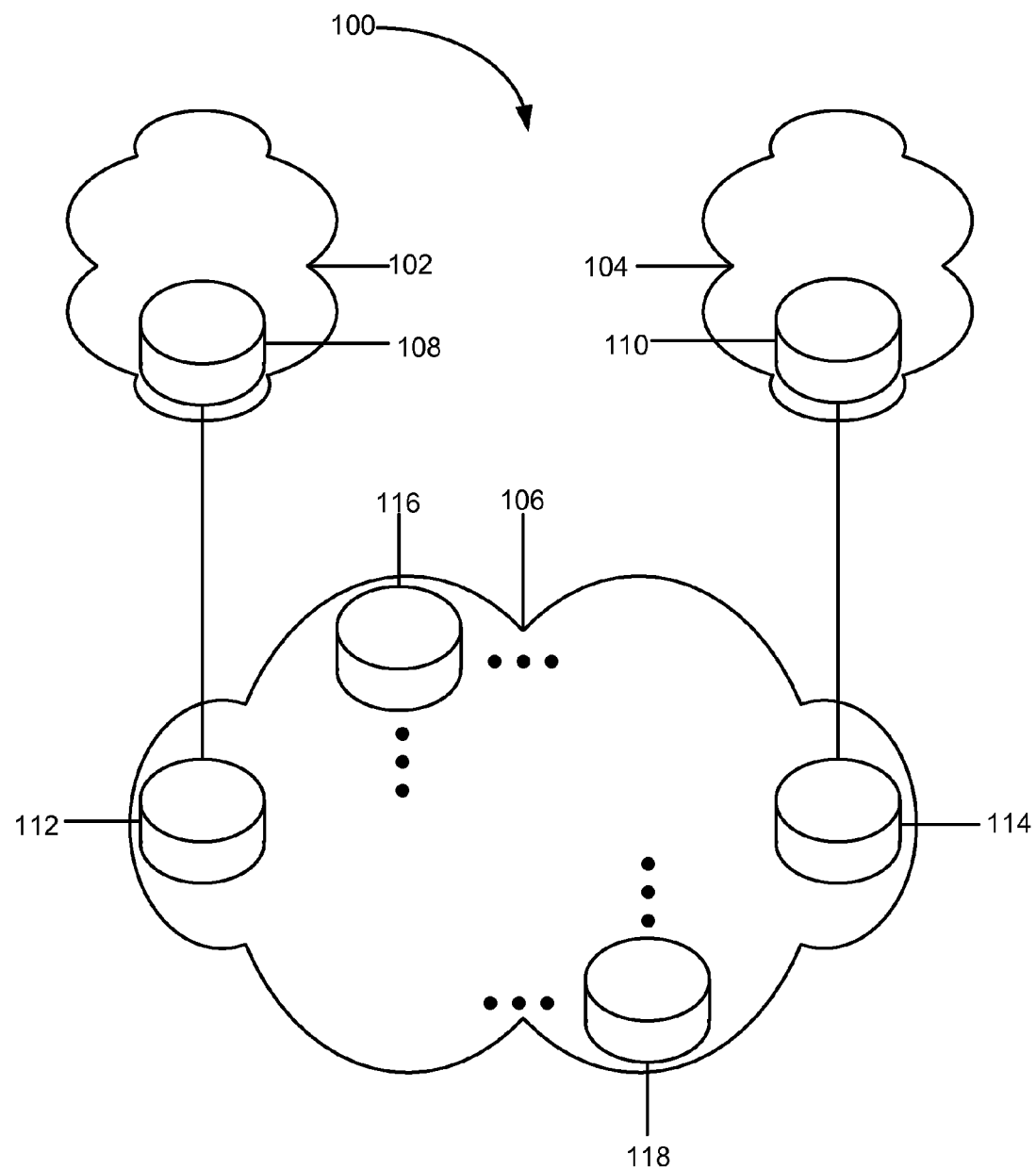
FIG. 1 shows a network in which multiple MPLS networks may be interconnected.

FIG. 1 shows a network 100 in which multiple MPLS networks may be interconnected. As shown, network 100 may include MPLS networks 102 and 104 and an internal network 106. MPLS networks 102 and 104 may include devices and/or systems for providing services, such as a Private IP (PIP) network service for voicemail, call blocking, calling card, audio and net conferencing, etc. In some implementations, MPLS network 104 may provide redundancy and/or the ability to distribute network load. As shown in FIG. 1, each of MPLS networks 102/104 may include Provider Edge (PE) routers 108/110, respectively. PE routers 108/110 may include routers that may provide an entry and/or an exit to and from MPLS networks 102/104. Other routers (not shown) in MPLS networks 102/104 may include routers that accept IP/MPLS packets and route them toward their destination devices.

Customer network 106 may include devices and/or systems for providing intranet services. In some implementations, customer network 106 may be based on particular network protocols, such as, for example, Ethernet, ATM, Frame Relay, and/or Time-division Multiplexing (TDM). In other implementations, customer network 106 may include one or more MPLS networks. As further shown in FIG. 1, customer network 106 may include customer edge (CE) routers 112 and 114 and internal routers 116 and 118. CE routers 112 and 114 may include routers located on customer premises and may provide an entry into and/or an exit from customer network 106. Internal routers 116 and 118 may route packets that enter customer network 106 toward their destination devices.

Figure 2:
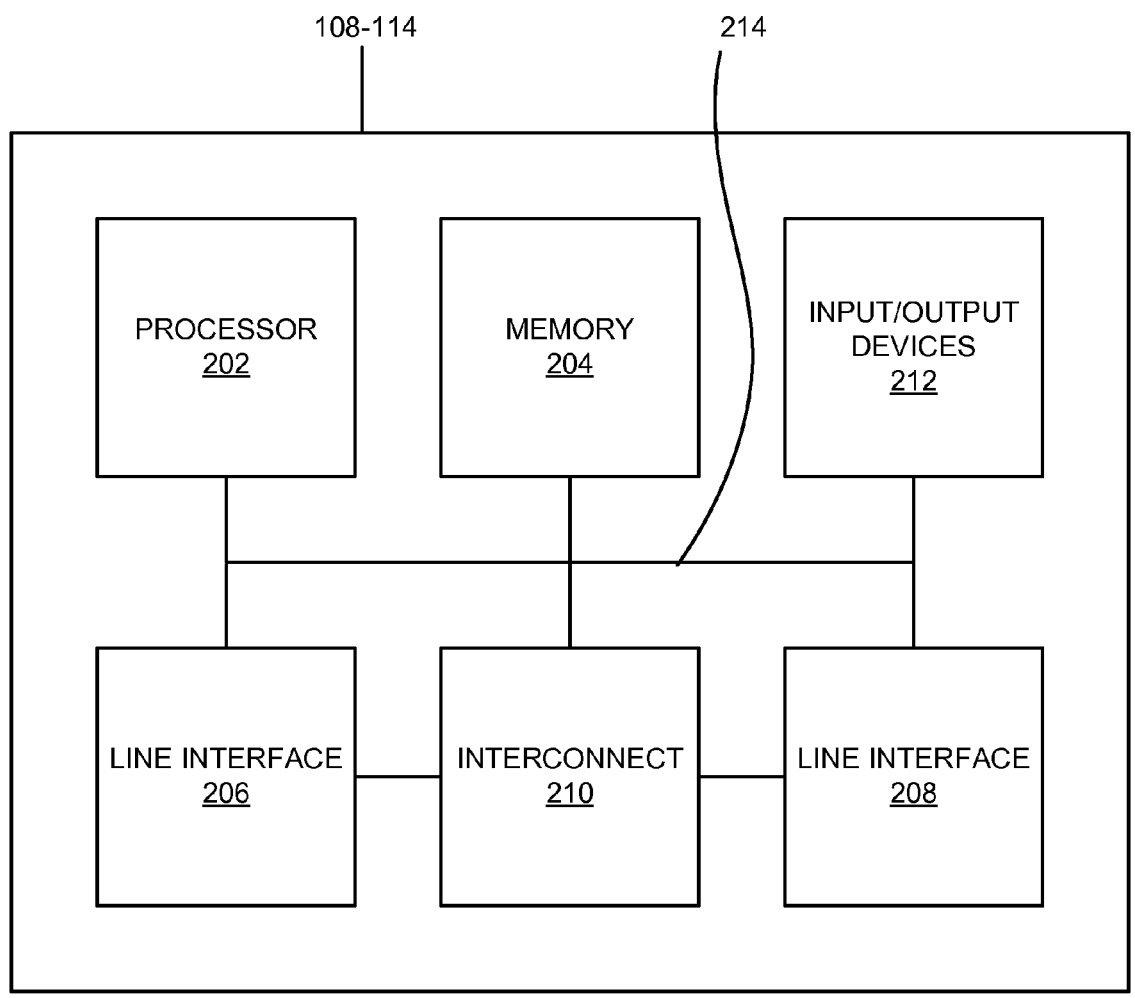
FIG. 2 is an exemplary block diagram of the Provider Edge (PE) routers, the Customer Edge (CE) routers, and the interior routers of FIG. 1.

FIG. 2 illustrates an exemplary block diagram of PE routers 108/110 and CE routers 112/114 of FIG. 1, hereinafter referred to as "edge routers 108-114." Each of edge routers 108-114 may include a processor 202, memory 204, line interfaces 206 and 208, an interconnect 210, input/output devices 212, and a bus 214.

Processor 202 may include one or more processors, microprocessors, and/or processing logic optimized for networking and communications. Processor 202 may process packets and/or network path-related information. Memory 204 may include static memory, such as read only memory (ROM), dynamic memory, such as random access memory (RAM), and/or onboard cache, for storing data and machine-readable instructions. Memory 204 may also include storage devices, such as a floppy disk, a CD ROM, a CD read/write (R/W) disc, and/or flash memory, as well as other types of storage devices. Line interfaces 206 and 208 may include devices for receiving incoming packets from networks and for transmitting packets to networks. Interconnect 210 may include switches for conveying an incoming packet from line interface 206 to line interface 208 based on a packet destination and stored path information. Examples of interconnect 210 may include a communication bus or a switch fabric. Input/output devices 212 may include a display console, keyboard, mouse, and/or other types of devices for converting physical events or phenomena to and/or from digital signals that pertain to edge routers 108-114. Input/output devices 212 may allow a user or a network administrator to interact with edge routers 108-114 (e.g., configure edge routers 108-114). Bus 214 may include a path that permits communication among components of each of edge routers 108-114.

Figure 3:
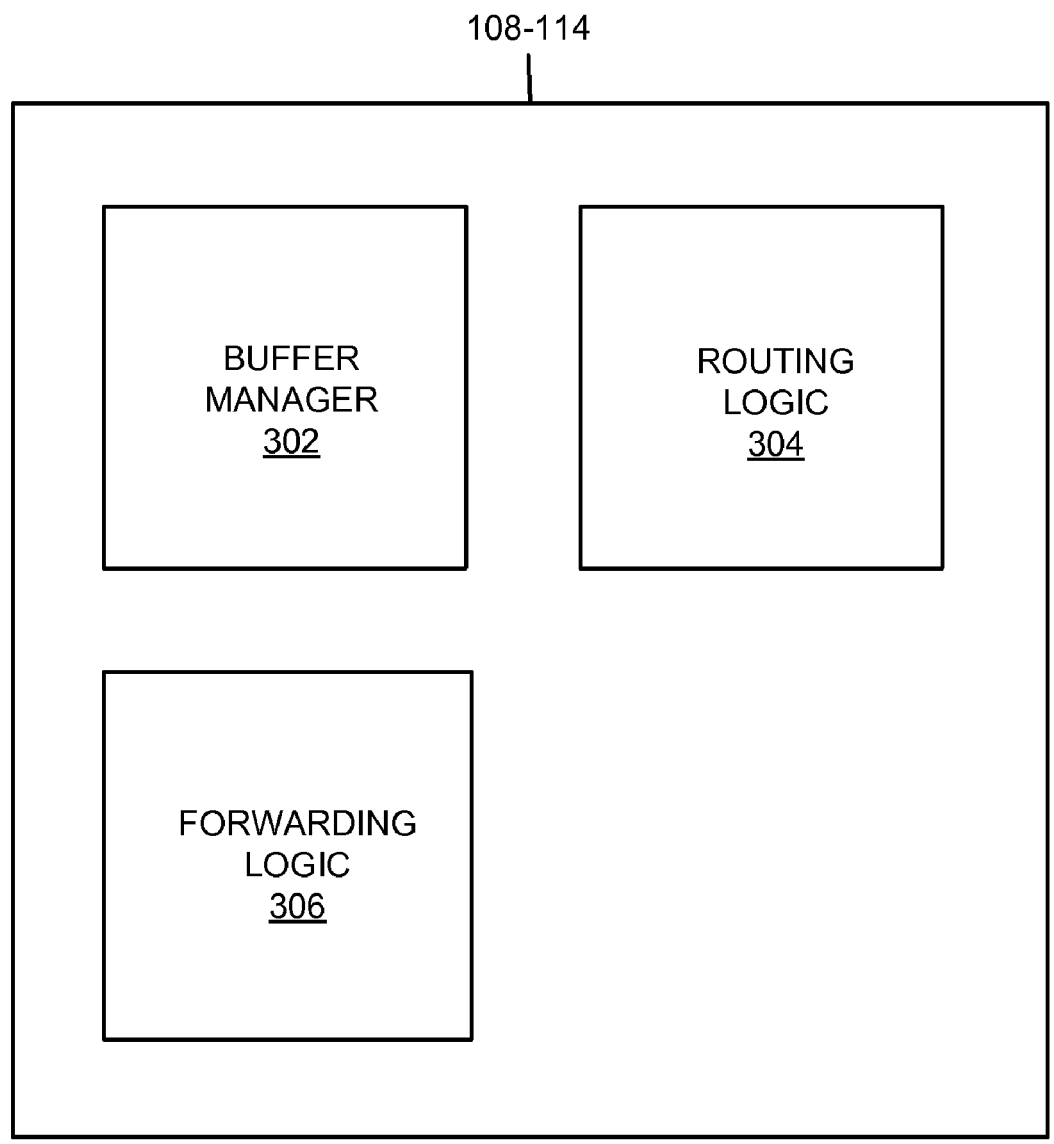
FIG. 3 is an exemplary functional block diagram of components included in the PE routers, the CE routers, and the interior routers of FIG. 1.

FIG. 3 is an exemplary functional block diagram of components that may be included in each of edge routers 108-114. As shown, each of edge routers 108-114 may include a buffer manager 302, routing logic 304, and forwarding logic 306. Buffer manager 302 may provide a buffer for queuing incoming packets. If packets arrive simultaneously, one or more of the packets may await in the buffer until higher priority packets are processed and/or transmitted. Routing logic 304 may include hardware and/or software for communicating with other routers to gather and store routing information in a routing information base. Forwarding logic 306 may include hardware and/or software for directing a packet to a proper output port on line interface 208 based on the routing information.

Figure 4A:
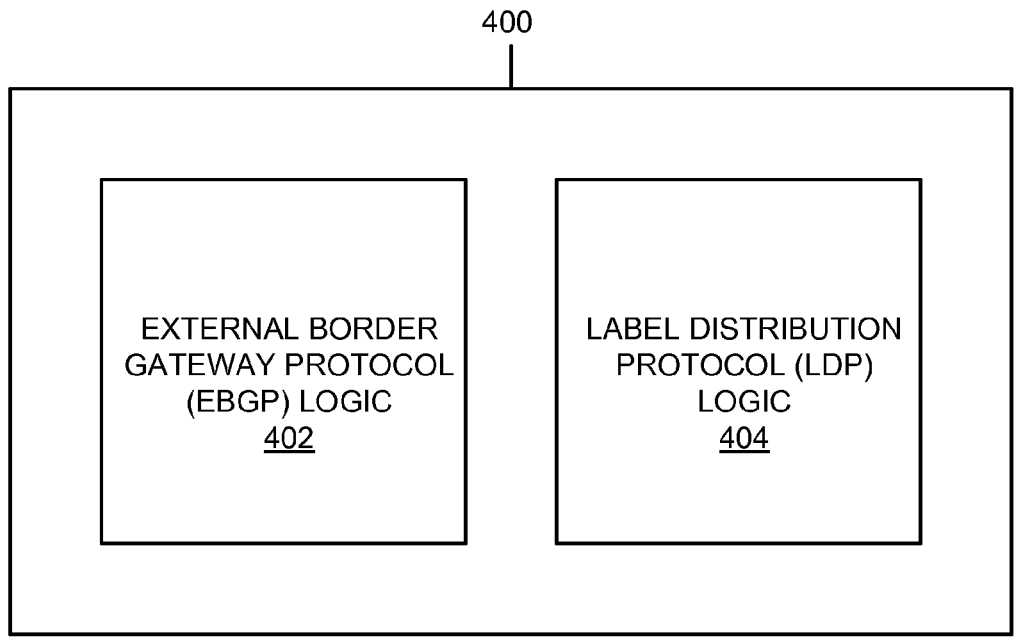
FIG. 4A shows an exemplary functional block diagram of one implementation of the routing logic of FIG. 3.

FIG. 4A shows an exemplary functional block diagram of one implementation of routing logic 304, illustrated as routing logic 400. Routing logic 400 may be included in PE routers 108/110. As shown, routing logic 400 may include External Border Gateway Protocol logic (EBGP) logic 402, and Label Distribution Protocol (LDP) logic 404. In different implementations, routing logic 400 in PE routers 108/110 may include additional, fewer, or different components than those illustrated in FIG. 4A. For example, in one implementation, routing logic 400 may include logic that may determine network paths based on constraints related to quality of service (QoS).

EBGP logic 402 may include hardware and/or software for maintaining and/or updating routing tables based on EBGP. In general, EBGP may be used by gateway hosts (e.g., edge routers 108-114) in a network (e.g., network 100) of autonomous systems (i.e., networks that are governed by a common set of network policies) (e.g., customer network 106) to maintain and update paths in routing tables. Each of the routing tables may include, for each destination, information about paths to reach the destination, and each of the paths may include addresses of gateway hosts that a packet may visit to reach the destination. The gateway hosts may maintain and update the routing table by exchanging routing information.

LDP logic 404 may include hardware and/or software for sharing labels (i.e., network addresses of routers in a MPLS network) with other PE routers and Provider Switching (PS) routers (i.e., MPLS routers that are not PE routers) within an MPLS network in accordance with label distribution protocol. LDP logic 404 may enforce a specific set of procedures (i.e., LDP protocol) for exchanging messages (e.g., LDP messages) about labels. Through the exchange of LDP messages, a label information base (LIB) of each router in network 106 may be populated with routing and label information.

Figure 4B:
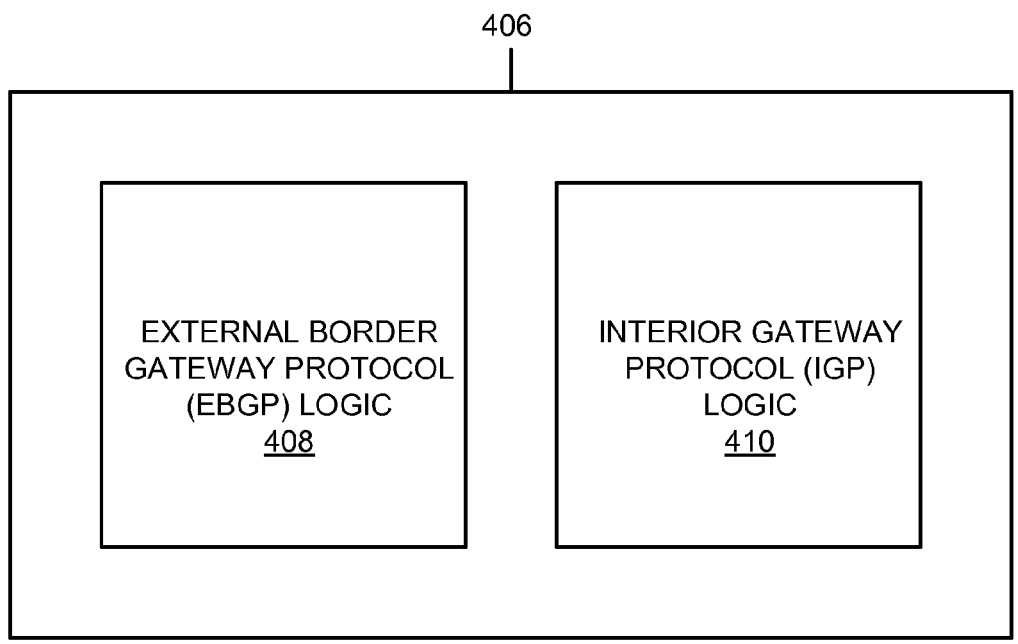
FIG. 4B shows an exemplary functional block diagram of another implementation of the routing logic of FIG. 3.

FIG. 4B shows an exemplary functional block diagram of another implementation of routing logic 304, illustrated as routing logic 406. Routing logic 406 may be included in CE routers 112/114. As shown, routing logic 406 may include EBGP logic 408 and Interior Gateway Protocol (IGP) logic 410. In different implementations, routing logic 406 in CE routers 112/114 may include additional, fewer, or different components than those illustrated in FIG. 4B.

EBGP logic 408 may include hardware and/or software that is similar to those included in EBGP logic 404 and may operate similarly to EBGP logic 404.

IGP logic 410 may include hardware and/or software for maintaining and/or updating routing tables based one of many possible routing protocols. The possible routing protocols may be either a distance-vector type or a link-state type. In distance-vector type protocols, each router may populate its routing tables by using information about local interconnections. Examples of distance-vector routing protocol may include Routing Information Protocol (RIP), Interior Gateway Routing Protocol (IGRP), or Enhanced Interior Gateway Routing Protocol (EIGRP). In link-state type protocols, each router may possess information about a complete network topology, and may compute paths based on both the complete network topology and local connection information. Examples of link-state type protocols may include Open Shortest Path First (OSPF) or Intermediate System-to-Intermediate System (IS-IS) protocol.

Figure 5:
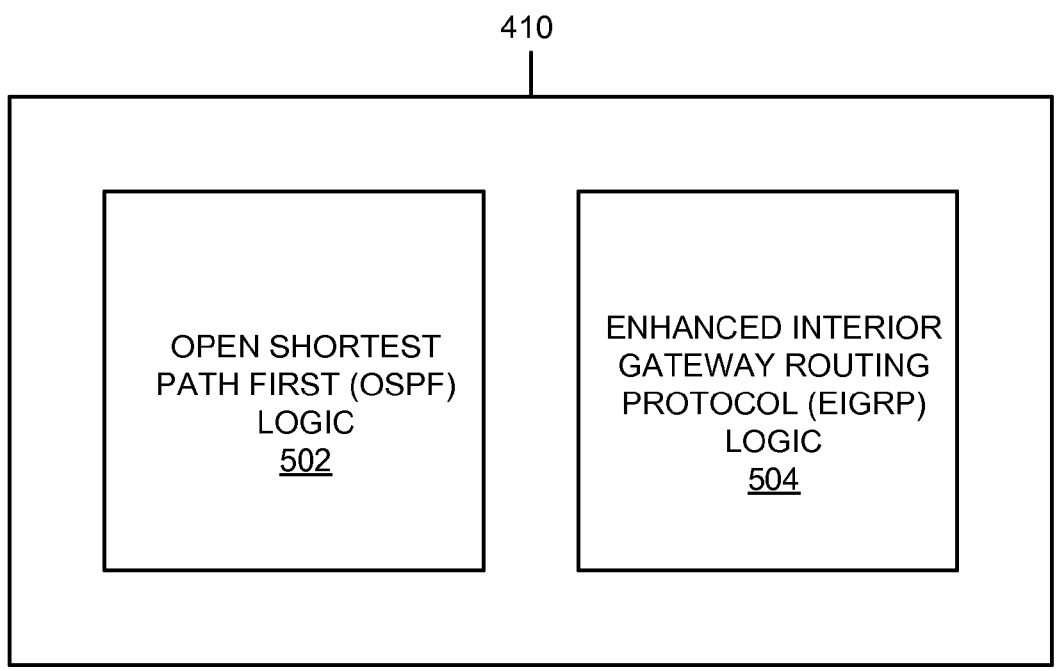
FIG. 5 shows an exemplary functional block diagram of the Interior Gateway Protocol (IGP) logic of FIG. 4B.

FIG. 5 shows an exemplary functional block diagram of IGP logic 410. As shown, IGP logic 410 may include OSPF logic 502 and/or Enhanced Interior Gateway Routing Protocol (EIGRP) logic 504. In different implementations, IGP logic 410 may include additional, fewer, or different components than those illustrated in FIG. 5. For example, in one implementation, IGP logic 410 may exclude OSPF logic 502 and include EIGRP logic 504.

OSPF logic 502 may include hardware and/or software for maintaining and updating routing tables based on OSPF. OSPF logic 502 may compute the shortest paths to other networks based on cost and the bandwidth of the network links. To adjust for changes in a network, OSPF logic 502 may send hello packets to other routers and may exchange network path information with other routers whenever there is a change in the network.

EIGRP logic 504 may include hardware and/or software for maintaining and updating routing tables based on EIGRP. EIGRP may determine distances to destinations based on path delay, bandwidth, reliability, and load. EIGRP may determine a stable set of routes for its routing table while imposing a significantly less burden on processor 202 and line interfaces 206/208 than a number of protocols, such as IGRP.

To determine the stable set of routes, EIGRP logic 504 may use a neighbor table (i.e., a table in which information about neighboring routers are kept) and a topology table (i.e., a table in which all routes advertised by neighboring routers are listed). In the topology table, EIGRP logic 504 may update destinations that are indicated as being in an active state (i.e., destinations for which network paths are being computed), in contrast to destinations in a passive state (i.e., destinations for which network paths are already determined). By choosing passive destinations that may not be part of a loop (i.e., a path that leads back to itself) and collecting the least distance path for each of the remaining passive destinations, EIGRP logic 504 may produce a routing table.

To determine destinations that may not be part of a loop, EIGRP logic 504 may test whether a neighbor router to a destination advertises a distance that is lower than the distance provided when the neighbor router previously transitioned from an active to a passive state. If the distance is lower, then the neighbor router may be determined as being not part of a loop.

EIGRP logic 504 may use five different metrics for determining the distance of a path. In computing a distance, EIGRP logic 504 may factor in a path delay, bandwidth, reliability, and load. More specifically, EIGRP logic 504 may evaluate:

$$D = \left(A_1 BW + \frac{A_2 BW}{256 - L} + A_3 T\right) \cdot \frac{256 \cdot A_4}{A_5 + R} \quad (1)$$

In expression (1), D, T, BW, R, L, and $A_1$-$A_5$ may respectively represent the distance, delay (μs), bandwidth (Kbits/s), reliability (i.e., a number between 1 and 255, where 255 is most reliable), load (i.e., a number between 1 and 255, where 255 represents a full load), and constants. In evaluating expression (1), routers in a network may share the same constants.

EIGRP may include many features for efficient and flexible maintenance of routing tables. For example, instead of making periodic updates to its routing table, EIGRP may update its routing table if the distance for a path to a destination changes and if no possible loop-free path to the destination exists. In such instances, EIGRP may mark the destination as active in its topology table and send a query packet to each of its neighboring routers, which in turn may propagate packets to other routers to collect information. After EIGRP receives a reply from each of the neighboring routers, EIGRP may mark the destination as passive, calculate distances, and determine a least-distance path to the destination. Because the updates to the routing table may be driven by changes to network configurations, EIGRP may be more efficient at saving network bandwidth than other protocols that may regularly update its routing table.

In another example, EIGRP may tag external routes with various pieces of information for applying network routing policies. Examples of tags may include an identifier of an EIGRP router that advertises a route, an identifier of the network of a destination, an identifier for an external protocol for the route, a distance based on the external protocol, etc. Based on various tags, EIGRP may allow network administrators to customize and maintain flexible control over routing. For example, within a router, a route may be tagged with EBGP and an identifier for PE router 108. A network administrator may implement a policy in which packets that arrive at CE router 112 from PE router 108 may maintain its required QoS across network boundaries.

In yet another example, EIGRP may perform network auto-summarization (i.e., automatically replace a set of addresses with a single address and a subnet mask that is associated with the single address). By using summarized addresses, EIGRP may reduce the amount of routing information that is stored and/or exchanged between routers. EIGRP performs address summarization based on the variable-length subnet masking (VLSM). The VLSM can provide for more compact summarization than subnet masking based on address classes (i.e., Class A, Class B, and Class C), and therefore, EIGRP may be more efficient than protocols that do not implement or use VLSM. EIGRP may not auto-summarize external routes unless the external routes contain a component of internal routes. However, EIGRP allows a user to perform a manual summarization of both external and internal routes.

Figure 6:
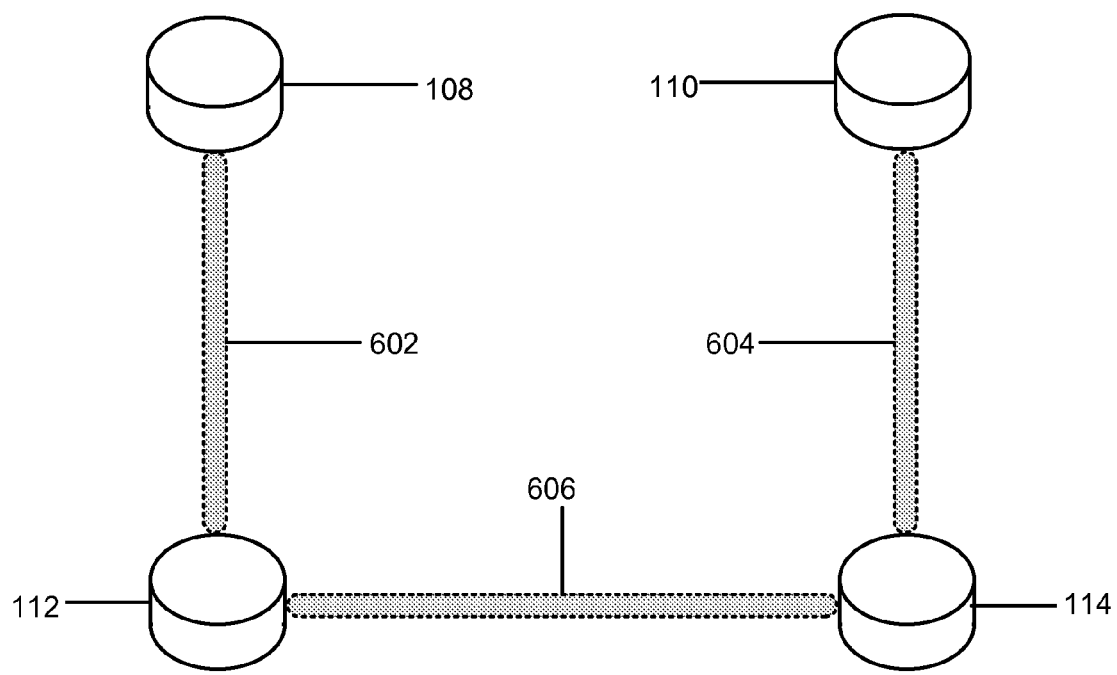
FIG. 6 depicts exemplary representations of communication protocols between the PE routers and the CE routers of FIG. 1.

FIG. 6 depicts exemplary representations of communication protocols between PE routers 108/110 and CE routers 112/114. As illustrated, PE router 108 may exchange routing information with CE router 112 through EBGP channel 602; PE router 110 may exchange routing information with CE router 114 through EBGP channel 604; and CE router 112 may exchange routing information with CE router 114 through IGP channel 606. EBGP channel 602/604 may be established between EBGP logic 402 of PE router 108/110 and EBGP logic 408 of CE router 112/114. IGP channel 114 may be established between IGP logic 410 of CE router 112 and that of CE router 114. In one implementation, IGP logic 410 may include EIGRP logic 504.

Figure 7:
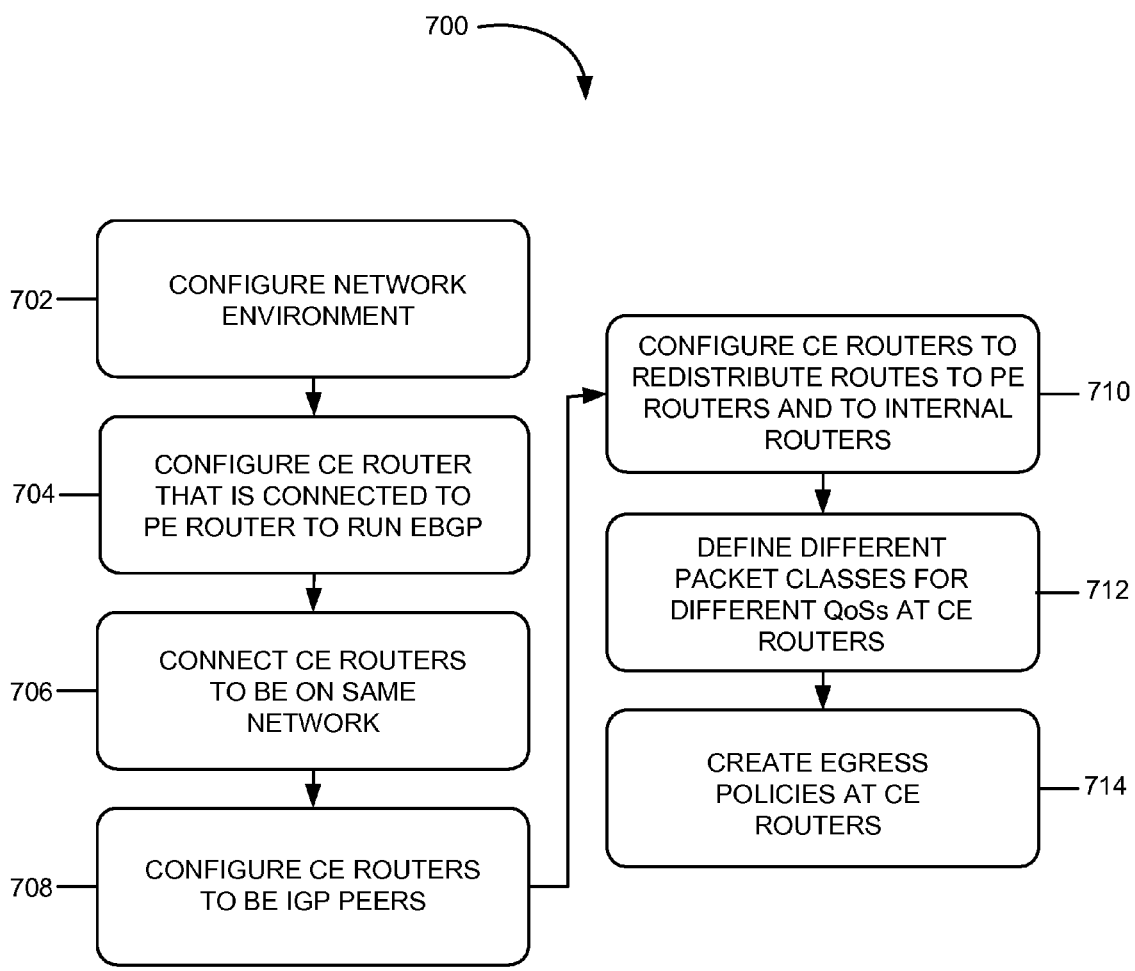
FIG. 7 shows an exemplary process for interconnecting multiple MPLS networks.

The above paragraphs describe system elements that are related to interconnecting multiple MPLS networks, such as PE/CE routers 108-114, routing logic 304, EBGP logic 402/408, IGP logic 410, and EIGRP logic 504. FIG. 7 depicts an exemplary process that is capable of being performed on one or more of these system elements.

FIG. 7 shows an exemplary process 700 for interconnecting multiple MPLS networks. Process 700 may start with block 702, at which network environment may be configured. To configure the network environment, network devices (e.g., routers) may be connected, and network parameters at the devices may set. More specifically, for each of multiple MPLS networks, a CE router may be connected to a PE router of the MPLS network, so that specific services can be rendered. For example, in FIG. 1, CE router 112 may be connected to PE router 108 of MPLS network 102 and CE router 114 may be connected to PE router 110 of MPLS network 104, to provide services such as telephone/video conferences, call blocking, etc.

At block 704, each CE router that is connected to a PE router may be configured to run EBGP between the CE router and the PE router. For example, CE router 112 may be configured to run EBGP logic 408 if CE router 112 exchanges routing information with PE router 108. Because PE router 108 is an edge router, PE router 108 may already run EBGP and may not need to be reconfigured.

At block 706, the CE routers may be connected (i.e., wired) to be on the same network. For example, the CE router 112 and CE router 114 connected so that they are part of an intranet.

At block 708, the CE routers may be further configured to be IGP peers (i.e., devices that are capable exchanging IGP routes with each other). The CE routers may be configured as IGP peers by having each CE router include IGP logic 410, so that the CE routers can exchange routing information with each other. In one implementation, the CE routers may be configured as EIGRP peers, so that each CE router may distribute routes to each other in accordance with EIGRP.

At block 710, the CE routers may be further configured to redistribute routes to the PE routers and to internal routers in the network associated with the CE routers. For example, in FIG. 1, CE router 112 may be configured to redistribute routes from PE router 108 to internal routers 116/118 in customer network 106, and to redistribute routes from internal routers 116/118 to PE router 108.

At block 712, different packet classes for different QoS may be defined at the CE routers. For example, Gold class and Silver class packets may be defined at CE router 112. Gold class packets may be delivered under expedited forwarding (i.e., low delay, low loss, and low jitter) and Silver class packets may be delivered with assurance, assuming that network traffic does not exceed a predetermined amount.

At block 714, egress policies may be created at the CE routers. Each egress policy, when enforced, may control and/or manage data packets that arrive at the CE routers. For example, an egress policy, when enforced, may convert a packet which arrives at CE router 112 from internal routers 116/118 and bears expedited forwarding (EF) markings (i.e., indications of one type of QoS) to a packet that bears Internet Protocol (IP) Precedence markings (i.e., another type of QoS).

Figure 8:
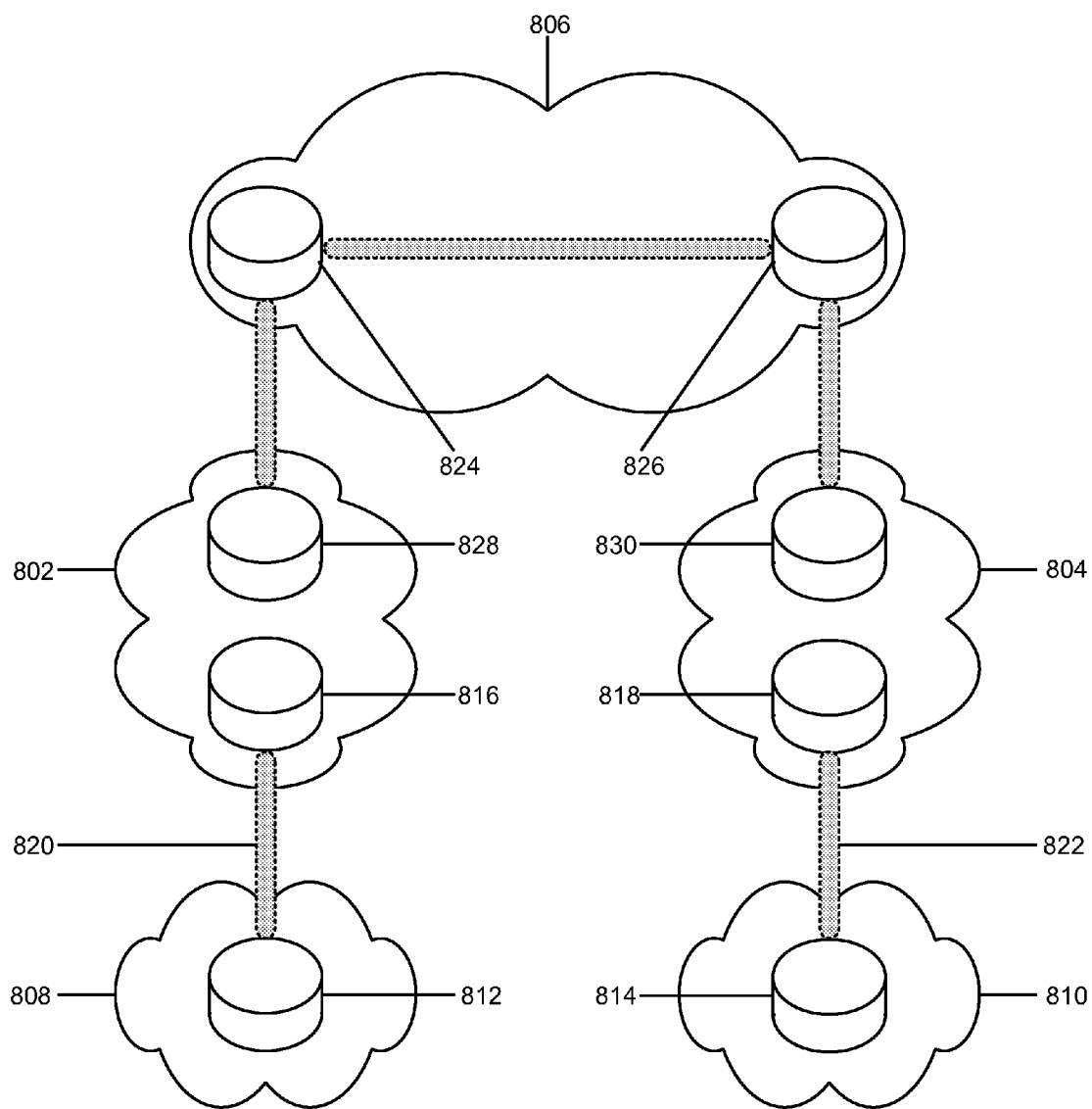
FIG. 8 shows another network in which multiple MPLS networks may be interconnected.

The exemplary process, described above in connection with FIG. 7, for interconnecting multiple MPLS networks may be further illustrated through the following example, in conjunction with FIG. 8. Assume, for the sake of the example, that each of MPLS networks 802 and 804 provides access services to Insure, Inc.'s customer network 806. Also, assume that clients (not shown) in local networks 808/810 can reach customer network 806 via CE routers 812/814 (e.g., Cisco 2851 Router with Advanced IP services) and through MPLS networks 802/804. Further, assume that CE routers 812/814 are configured to exchange routing information with PE routers 816/818 on EBGP channels 820/822. CE router 812 uses Differentiated Service Control Point (DSCP) markings to differentiate levels of QoSs for packets, and CE router 814 uses IP precedence markings to differentiate levels of QoSs for packets.

To interconnect MPLS networks 802/804 to customer network 806, customer network 806 is physically arranged so that CE router 824 (e.g., Cisco 7206 Router with Advanced IP services) and CE router 826 can send routing information to PE router 828 and PE router 830. CE router 824 is setup to run EBGP between CE router 824 and PE router 828, and CE router 826 is setup to run EBGP between CE router 826 and PE router 830.

CE routers 824/826 are connected within the same network. Once CE routers 824/826 are on customer network 806, CE routers 824/826 are configured as peers that can exchange routing information in accordance with EIGRP. The configuration is performed through an automatic execution of stored router commands upon CE router 824/826 boot up.

CE routers 824/826 are further configured to redistribute routes to PE routers 828/830 and to other routers in customer network 806. After the configuration, if CE routers 824/826 receive routing information from a router within customer network 806, CE routers 824/826 may send (i.e., "redistribute") the routing information to PE routers 828/830. Similarly, if CE routers 824/826 receive routing information from PE routers 828/830, CE routers 824/826 may send the routing information to routers that are within customer network 806 and are adjacent to CE routers 824/826. The configuration is performed through an automatic execution of routing commands.

At CE routers 824/826, SilverHigh, SilverLow, and Gold classes are defined for different QoSs. At CE router 824, an egress policy is created that, when enforced, converts exiting packets that require SilverHigh QoS to packets that require "DSCP AF41" QoS; converts packets that require SilverLow QoS to packets that require "DSCP AF31" QoS; and converts packets that require Gold QoS to packets that require "DSCP EF" QoS. At CE router 826, an egress policy is created that, when enforced, converts exiting packets that require Silver QoS to packets that require "IP precedence 3" QoS; and converts packets that require Gold QoS to packets that require "IP precedence 5" QoS. The creation of the policies concludes interconnecting MPLS networks 802 and 804.

In the above example, because CE routers 824/826 use EIGRP to exchange routes with PE routers 828/830, and EIGRP uses the variable-length subnet masking to auto-summarize network paths, the CE routers may provide more efficient network auto-summarization than CE routers that use Interior Border Gateway Protocol (IGBP). EIGRP provides for additional flexibility by allowing manual summarization. In addition, if a data packet travels from CE router 812 to CE router 814 through MPLS networks 802/804 and customer network 806, the data packet QoS that is described in terms of DSCP at CE router 812 may be modified so that its QoS is described in terms of IP precedence when the packet leaves CE router 826. The policies allow CE routers 824/826 to control and maintain a desired level of QoS for packets that travel across customer network 806.

The above example illustrates how network paths may be established between multiple MPLS networks. The MPLS networks may be interconnected using devices that exchange routing information with each other through IGP and with routers in the MPLS network through EBGP. By using IGP between the devices as its routing protocol, it is possible to obtain a flexible control and efficient and flexible network summarization. As explained above, if EIGRP is used as IGP, EIGRP may perform auto-summarization (i.e., automatically replace a set of addresses with a single address and a subnet mask that is associated with the single address) and allow a manual summarization that are based on the VLSM. The VLSM can provide more compact auto-summarization than subnet masking based on address classes, and, therefore, EIGRP may be more efficient than protocols that do not implement or use VLSM.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to the process illustrated in FIG. 7, the order of the blocks may be modified in other implementations. For example, block 712 may be performed before block 710. Further, non-dependent blocks may represent blocks that can be performed in parallel. For example, blocks 710 and 712 may be performed in parallel. In another example, blocks 702 and 706 may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   configuring a first customer edge (CE) router to run external border gateway protocol (EBGP) to exchange routing information with a first provider edge (PE) router that is in a first multi-protocol label switching (MPLS) network;
   setting the first CE router and a second CE router as enhanced interior gateway route protocol (EIGRP) peers;
   configuring the first CE router to run an EIGRP to exchange routing information with the second CE router;
   configuring the first CE router to perform auto-summarization of routes;
   configuring the second CE router to run the EIGRP to exchange routing information with the first CE router;
   creating, at the first CE router, quality-of-service (QoS) egress policies that convert a packet arriving at the first CE router and bearing indications of a first type of QoS to a packet bearing indications of a second type of QoS;
   configuring the second CE router to run the EBGP to exchange routing information with a second PE router in a second MPLS network; and
   exchanging routing information between the first CE router and the second CE router in accordance with EIGRP.

2. The method of claim 1, further comprising:
   placing the first CE router and the second CE in a same customer network.

3. The method of claim 1, further comprising:
   defining different quality-of-service classes at the first CE router than at the second CE router.

4. The method of claim 1, further comprising:
   sending routing information from the first PE router to routers in the first MPLS network in accordance with a label distribution protocol.

5. The method of claim 1, further comprising:
   sending routing information from the first PE router to routers in the first MPLS network in accordance with an internal border gateway protocol.

6. The method of claim 1, further comprising:
selecting, at the first CE router, a route that is not part of a loop.

7. The method of claim 1, further comprising:
sending a packet to request routing information from the first CE router when a distance to a network destination changes.

8. The method of claim 1, further comprising:
determining a distance of a route based on at least one of delay, bandwidth, reliability, or load associated with the route.

9. A network comprising:
a first customer edge (CE) router that is connected to a first provider edge (PE) router in a first multi-protocol label switch (MPLS) network and is configured to:
enforce, quality-of-service (QoS) egress policies that convert a packet arriving at the first CE router and bearing indications of a first type of QoS to a packet bearing a second type of QoS;
communicate with the first PE router using an external border gateway protocol (EBGP) and to perform auto-summarization of routes; and
a second CE router that is connected to a second PE router in a second MPLS network, the second CE router configured to:
exchange routes with the second PE router based on the EBGP; and
redistribute routes to the first CE router in accordance with an enhanced interior gateway route protocol (EIGRP).

10. The network of claim 9, wherein the second CE router includes:
a neighbor table that lists neighboring routers.

11. The network of claim 9, wherein the second CE router includes an egress policy that convert a packet arriving at the second CE router and bearing indications of one type of QoS to a packet bearing indications of another type of QoS.

12. The network of claim 9, wherein the second CE router includes a topology table that includes active and passive destinations.

13. The network of claim 9, wherein the second CE router includes definitions of packet classes for different levels of quality-of-service.

14. The network of claim 9, wherein the second CE router includes a list of routes, each of which is not part of a loop.

15. A network comprising:
means for configuring a first CE router to run an external border gateway protocol (EBGP) to exchange routing information with a first provider edge (PE) router that is in a first multi-protocol label switching (MPLS) network;
means for setting the first CE router and a second CE router as enhanced interior gateway route protocol (EIGRP) peers;
means for configuring the first CE router to run an EIGRP to exchange routing information with the second CE router;
means for configuring the first CE router to perform auto-summarization of routes;
means for enforcing, at the first CE router, quality-of-service (QoS) egress policies that convert a packet arriving at the first CE router and bearing indications of a first type of QoS to a packet bearing a second type of QoS;
means for configuring the second CE router to run the EBGP to exchange routing information with a second PE router in a second MPLS network; and
a line interface for exchanging routing information between the first CE router and the second CE router in accordance with the EIGRP.

16. A method comprising:
configuring a first customer edge (CE) router to run external border gateway protocol (EBGP) to exchange routing information with a first provider edge (PE) router that is in a first multi-protocol label switching (MPLS) network;
setting the first CE router and a second CE router as enhanced interior gateway route protocol (EIGRP) peers;
configuring the first CE router to run an EIGRP to exchange routing information with the second CE router;
configuring the second CE router to run the EIGRP to exchange routing information with the first CE router;
creating, at the first CE router, quality-of-service (QoS) egress policies that convert a packet arriving at the first CE router and bearing indications of a first type of QoS to a packet bearing a second type of QoS;
configuring the second CE router to run the EBGP to exchange routing information with a second PE router in a second MPLS network; and
exchanging routing information between the first CE router and the second CE router in accordance with EIGRP.

* * * * *